United States Patent
Solomon et al.

(10) Patent No.: US 7,198,205 B1
(45) Date of Patent: Apr. 3, 2007

(54) SILICONE PROTECTIVE COATING

(75) Inventors: Jerry Solomon, Winthrop, WA (US);
Matthew Napoli, Lake Forest, IL (US)

(73) Assignee: Anderson & Associates, LLC, Shorthills, NJ (US)

( * ) Notice: Subject to any disclaimer, the term of this patent is extended or adjusted under 35 U.S.C. 154(b) by 33 days.

(21) Appl. No.: 10/899,453

(22) Filed: Jul. 26, 2004

Related U.S. Application Data

(60) Provisional application No. 60/489,818, filed on Jul. 24, 2003.

(51) Int. Cl.
*B05B 7/32* (2006.01)
*C08L 83/04* (2006.01)

(52) U.S. Cl. .................. 239/337; 239/573; 528/18; 528/34; 528/43; 524/366; 524/378; 524/474

(58) Field of Classification Search .............. None
See application file for complete search history.

(56) References Cited

U.S. PATENT DOCUMENTS

| | | | |
|---|---|---|---|
| 4,218,359 A * | 8/1980 | Marwitz et al. ............ 524/794 |
| 4,495,168 A | 1/1985 | Schmolka |
| 4,534,959 A | 8/1985 | Schmolka |
| 4,568,718 A * | 2/1986 | Huebner et al. ............ 524/837 |
| 4,584,324 A * | 4/1986 | Bauman et al. ............ 521/88 |
| 5,087,684 A * | 2/1992 | Perrin ....................... 528/22 |
| 5,502,144 A * | 3/1996 | Kuo et al. .................. 528/18 |
| 5,650,146 A | 7/1997 | Shaw |
| 6,200,964 B1 | 3/2001 | Singleton et al. |
| 6,306,998 B1 * | 10/2001 | Kimura et al. ............ 528/12 |
| 6,352,699 B1 | 3/2002 | Mondet et al. |
| 6,384,023 B2 | 5/2002 | Singleton et al. |
| 6,387,357 B1 | 5/2002 | Chopra et al. |
| 6,403,067 B1 | 6/2002 | Schamper et al. |
| 6,468,512 B1 | 10/2002 | Carmody |
| 6,562,324 B1 | 5/2003 | Kumar et al. |
| 6,576,623 B1 | 6/2003 | Nakanishi et al. |
| 6,756,425 B2 * | 6/2004 | Mogi et al. ................ 523/212 |

* cited by examiner

*Primary Examiner*—Marc S. Zimmer
(74) *Attorney, Agent, or Firm*—Garvey, Smith, Nehrbass & North, L.L.C.; Seth M. Nehrbass; Jacqueline M. Daspit

(57) ABSTRACT

A silicone polymer gel/coating which can be sprayed from an aerosol can preferably has a viscosity of 2,000–5,000 cps. and provides a moisture resistant coating of preferably 20–30 mils to protect components in telephone installation and maintenance applications. It is preferably sprayed from a can using Spray Actuator OTP 0025.

28 Claims, 1 Drawing Sheet

SILICONE PROTECTIVE COATING

CROSS-REFERENCE TO RELATED APPLICATIONS

Priority of our U.S. Provisional Patent Application Ser. No. 60/489,818, filed 24 Jul. 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to silicone. More particularly, the present invention relates to silicone sprays.

2. General Background of the Invention

There is a product on the market today that some of the telephone companies use called Revite MDP-30 Moisture Displacement. This product is more a lubricant than a moisture barrier. It is a trichloroethylene-based product.

The following U.S. Patents are incorporated herein by reference:

U.S. Pat. Nos. 4,495,168 4,534,959 5,650,146 6,200,964 6,352,699 6,384,023 6,387,357 6,403,067 6,468,512 6,562,324 6,576,623.

U.S. Pat. No. 6,468,512 discloses a silicone gel antiperspirant/deodorant with a viscosity from 7,000 cps to 30,000 cps.

U.S. Pat. No. 6,384,023 discloses a silicone gel that can be sprayed in aerosol form (see column 4, lines 42–43). It mentions dimethyl polysiloxanes (see lines 50+ in column 3). U.S. Pat. No. 6,200,964 is related to this patent.

U.S. Pat. No. 5,650,146 discloses a sprayable aerosol silicone that forms a gel on contact with human skin.

U.S. Pat. No. 6,576,623 discloses a silicone gel.

BRIEF SUMMARY OF THE INVENTION

The present invention includes a silicone gel/coating (preferably Shore A Durometer 11–15, e.g. Shore A Durometer 12) which can be sprayed from an aerosol can. The silicone polymer preferably has a viscosity of 70–10,000 cps., and more preferably 2,000–5,000 cps. It is preferably sprayed from a can using Spray Actuator OTP 0025. Preferably, suitable crosslinkers are used to cause the coating to have the desired properties.

The present invention includes a silicone composition which can be sprayed from an aerosol can to form a gel preferably comprises a silanol polymer, a cross linker, a catalyst, and a solvent. The silicone composition preferably comprises by weight: about 10–30% of the silanol polymer; about 2.85–11.8% of the cross linker; about 0.01–1.0% of the catalyst; and about 55–80% of the solvent. The silicone composition can comprises by weight: at least about 10% of the silanol polymer; at least about 2.85% of the cross linker; at least about 0.01% of the catalyst; at least about 55% of the solvent. Preferably, the silanol polymer is at least one from the group consisting of $\alpha$, $\omega$-dihydroxy dimethyl polysiloxane silicone polymer, $\alpha$, $\omega$-dihydroxy dialkyl polysiloxane polymer, $\alpha$, $\omega$ di/trimethoxy dimethyl polysiloxane polymer, and $\alpha$, $\omega$-dihydroxy dimethyl diphenyl polysiloxane polymer; the cross linker is at least one from the group consisting of Methyl Oxime Silane, Vinyl tris-(2-butanoneoxime) silane, tetra (2-butanoneoxime), and methyl trialkoxy silane; the catalyst is at least one from the group consisting of dibutyl tin dilaurate, dibutyl tin diacetate, and dibutyl tin dioleate; and the solvent is pentane.

The apparatus of the present invention preferably includes an aerosol can containing the composition. Preferably, the aerosol can has a foaming dispensary; the foaming dispensary can be, for example, a spray actuator OTP 0025. Preferably, there is a propellant in the can. Preferably, there is a spare spray actuator with the can.

The present invention also includes a method of providing a moisture resistant coating, comprising spraying the composition onto an object to be protected. The present invention also includes a method of providing a moisture resistant coating, comprising using the aerosol can to spray a coating onto an object to be protected. Typically, the object to be protected is wiring or an electrical connection.

The silanol polymer is preferably at least one from the group consisting of OH 2.0, OH 3.5, OH 4.0, and Dow Corning® 30-213; and the cross linker is at least one from the group consisting of OX10, OX-20, and OX-30.

Preferably, the composition has a viscosity of about 2,000–5,000 cps.

Preferably, the propellant is mixed with the composition such that the composition is 70–90% by weight and the propellant is 10–30% by weight.

The present invention also includes a spray-on moisture resistant coating produced by using the composition The moisture resistant coating is provided for at least one from the following group: telephone pedestals, the wiring of telephone pedestals, the connecting blocks of telephone pedestals, splices, joints, and other electrical connecting devices that are subject to environmental conditions.

Preferably, the gel has dielectric constant of about 2.0–4.0 @ 100 Hz, and more preferably not more than 3.7 @ 100 Hz.

Preferably, the composition is air cured.

Preferably, the aerosol can is flushed with nitrogen prior to filling.

Preferably, the silanol polymer is a silanol of a dialkyl polysiloxane polymer and/or a silanol of a diaryl polysiloxane polymer.

The present invention includes a method of providing a spray-on moisture barrier, and the spray-on moisture barrier itself, for telephone pedestals (such as for the wiring of telephone pedestals and the connecting blocks of telephone pedestals), splices, joints and other electrical connecting devices that are subject to environmental conditions. The material preferably sprays on as a liquid and preferably catalyzes to a gel. The spray can be applied in for example one minute intervals. Each coat can provide about a 1–4 mil film, for example a 2–3 mil film. The film can be built up to about 1–125 mils, for example to about 10–40 mils, and typically to about 20–30 mils. A period of about 8–10 hours is typically needed for the material to completely dry.

The material preferably has an extremely low dielectric (such as as low as around 2.0–4.0 @ 100 Hz, typically around 2.3–3.7@ 100 Hz, and e.g. 2.3@ 100 Hz), which makes it ideal for electrical applications. Once applied, the material can be wiped off with a clean rag at the time of application. If left alone, it will form a permanent moisture barrier.

The moisture barrier is preferably applied as follows:

1. make sure the wiring or surface to be sprayed, is substantially free of moisture and contaminants, and clean and/or dry if not;
2. hold the can 6–10 inches (e.g., 8 inches) away from the surface to be treated;
3. spray thin even coats (e.g., 1–4 mils thick) until the sprayed compound is seen to start to run;
4. spray from different angles to completely cover the connection;
5. allow to dry for 1–3 minutes (e.g., one minute) between coats;
6. if the button becomes clogged use a fresh button which is preferably included with each can.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
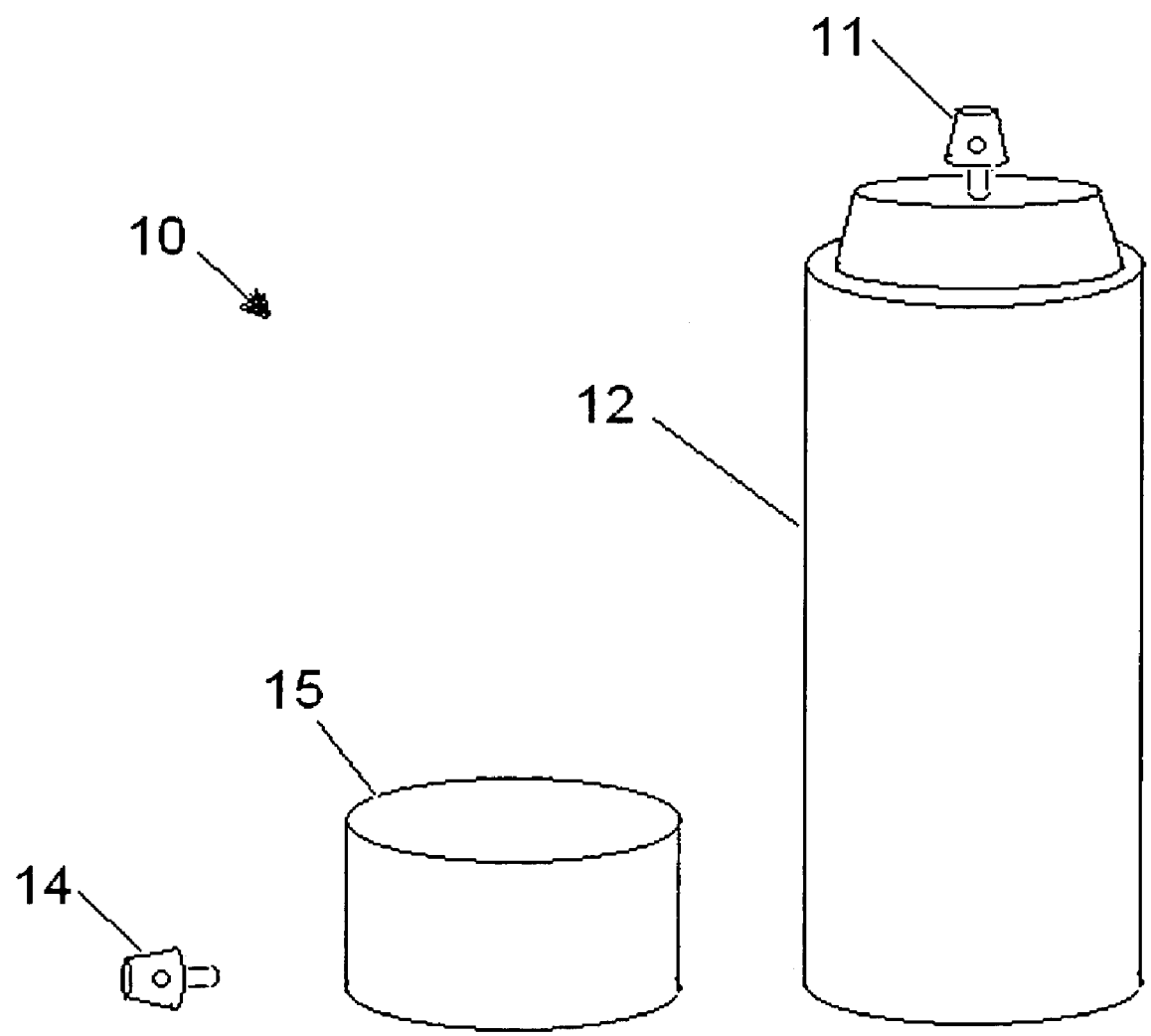
FIG. 1 is a perspective view of the preferred embodiment of the apparatus of the present invention.

The present invention includes a silicone gel which can be sprayed from an aerosol can.

FIG. 1 shows the apparatus 10 of the present invention, including an aerosol can 12 having a first spray actuator 11, a spare spray actuator 14, and a cap 15.

The silicone polymer preferably has a viscosity of 70–10,000 cps., more preferably has a viscosity of 1,000–6,000 cps., and most preferably has a viscosity of 2,000–5,000 cps. It is preferably sprayed from can 12 using Spray Actuator OTP 0025.

A formulation for a first embodiment of the present invention is set out below:

The formulation is mixed with propellant (such as dimethyl ether) in a ratio such that, when mixed, the formulation is preferably 70–90% by weight and the propellant is preferably 10–30% by weight.

Spray-on Silicone

Primary Application: The present invention was designed to offer a spray-on moisture barrier for telephone pedestals and other telephone connecting devices that are subject to the environmental conditions. The idea is to spray on a silicone spray that catalyzes to a gel/coating and is air cured.

Technical details: The product is preferably a conventional silicone system which is air cured. It preferably has a reactive silicone polymer that is preferably silanol terminated/hydroxyl terminated. It preferably has a basic silicone backbone (PDMS). In the first embodiment of the present invention, there are preferably five ingredients as follows:

1 Silanol-functional Polymer; poyldimethyl siloxane

2 Cross Linker OX10 (Methyl Oxime Silane);

3 Catalyst (tin based);

4 Propellant; and

5 Solvent (hydrocarbon-but California approved).

The spray is preferably designed to leave a 20–30 mil coating, typically applied in several layers. It is preferably designed for a median temperature of 72 degrees F. (22° C.) at a relative humidity of 50%. At this temperature and humidity, the skin-over time will preferably be less than 30 minutes, more preferably less than 15 minutes, even more preferably less than 5 minutes, more preferably less than 3 minutes, and most preferably less than 1 minute (typically the skin-over time is 1–3 minutes) and full cure will preferably take not more than 8–12, and preferably not more than 8 to 10 hours. It will preferably work at extreme temperature ends but the curing times will be affected. One could easily have a cold and hot weather version by altering the amount of catalyst (more catalyst (e.g. 0.05%) is pref-

TABLE 1

Formulation of first embodiment

| Ingredient (alternatives) | Purpose | % by weight | Preferred % by weight | More Preferred % by weight | Most Preferred % by weight | Example % by weight |
| --- | --- | --- | --- | --- | --- | --- |
| Silanol Polymer (4,000 cps.) | Polymer Coating | 21.0 | 15–30 | 18–24 | 19–22 | 21.0 |
| OX10 Methyl Oxime Silane (Methyl trialkoxy silane) | Crosslinker | 4.0 | 3.4–4.6 | 3.8–4.2 | 4.0 | 4.0 |
| TL-10 Dibutyl Tin Dilaurate (Dibutyl TIN Diacetate or Dibutyl TIN Dioleate) | Catalyst | 0.02–0.05 | 0.02–0.05 | 0.02–0.05 | 0.025–0.05 | 0.03 |
| Pentane (None) | Solvent | 75.0 | 65.8–76.2 | 70.9–76.1 | 74.0–76.0 | 75.0 | erably used for cold, dry weather while less catalyst (e.g. 0.02%) is preferably used for hot, humid weather).

Alternative Applications: The inventors see uses for this product in other markets such as automotive, construction, aerospace and household, and maritime.

Silicone Spray Coating

The present invention includes a curable silicone aerosol spray. The inventors decided to develop a silicone product that would cure and be applied from an aerosol can. Three preferred features of the present invention are (1) a non-slumping material for vertical surfaces (with a viscosity when first sprayed of preferably 15–40 cps.), (2) a relatively fast cure or skin-over time (such as preferably about 1–3 minutes) and (3) a relatively thick coating (such as 1–4 mils per layer).

A formulation for a second, preferred, embodiment of the present invention is set out below:

TABLE 2

Formulation of second embodiment

| Ingredient (preferred alternatives) | Purpose | % by weight | Preferred % by weight | More Preferred % by weight | Most Preferred % by weight | Example % by weight |
|---|---|---|---|---|---|---|
| OH 3.5 (OH 4.0*) | Polymer Coating | 10–30 | 15–30 | 18–24 | 19.0–22.0 | 21.0 |
| OX-20 (Methyl trialkoxy silane) | Crosslinker | 1.35–2.1 | 1.53–2.07 | 1.71–1.89 | 1.8 | 1.8 |
| OX-30 (Methyl trialkoxy silane) | Crosslinker | 1.50–2.5 | 1.87–2.53 | 2.09–2.31 | 2.2 | 2.2 |
| TL-10 Dibutyl Tin Dilaurate (Dibutyl TIN Diacetate or Dibutyl TIN Dioleate) | Catalyst | 0.5–1.0 | 0.6–0.9 | 0.675–0.825 | 0.75 | 0.75 |
| Pentane (None) | Solvent | 55–95 | Balance | Balance | 75.0 | 75.0 |

*Dow Corning ® 30-213 Polymer

The formulation is mixed with propellant (such as dimethyl ether) in a ratio such that, when mixed, the formulation is preferably 70–90% by weight and the propellant is preferably 10–30% by weight.

1. Pentane ($C_5H_{12}$)/Solvent:

This was selected to provide the best and preferred spray pattern along with the propellant. It is most preferred to use pentane since it provides the proper and preferred spray pattern and solvency. Other hydrocarbons, such as hexane or heptane can be used but have higher evaporation rate along with higher boiling points. The use of aromatic hydrocarbons, such as toluene or xylene were investigated but because industrial supplies of these chemicals can contain significant amounts of water, they were deemed unsuitable as a diluent or solvent resulting in too short of a shelf life.

2. Dimethyl Ether ($C_2H_6O$)/Propellant:

The dimethyl ether was chosen to achieve the preferred properties and spray of the formulation when dispensed from the aerosol can in combination with the pentane. The combination of the pentane and dimethyl ether proved to be very effective in meeting the inventors' requirements.

3. POLYMER OH 3.5 ($\alpha$, $\omega$-dihydroxy dimethyl polysiloxane silicone polymer):

(Manufacturer: hanse chemie AG, Dow Corning Corp. General Electric Corp. et al.)

This material is a basic polymer of 3,500 cps. viscosity and the ingredient that cures to a rubbery film or coating. The inventors' work and studies indicated that too low a viscosity (below 2,000 cps.) caused the formulation to slump or drip on vertical surfaces. Too high of a viscosity (above 5,000 cps.) resulted in some incompatibility with the solvent/propellant blend. Therefore, the viscosity of the silicone polymer is believed to be very important in the formulation.

4. Crosslinker OX-20 (Vinyl tris-(2-butanoneoxime) silane):

(Manufacturer: Allied Honeywell, hanse chemie Ag & Nitro Chemie).

This crosslinker was selected because of its ability to produce a relatively fast skin-over time and is well known in the one-part sealant industry for this characteristic.

5. Crosslinker OX-30 (tetra(2-butanone oxime) silane in toluene):

(Manufacturer: Same as for OX-20)

This crosslinker is a tetra-functional material that offers rapid curing and is important to achieve a cure within a few minutes (less than 3 or 4 minutes). Due to this property, it was evaluated and placed in the preferred formulation of the present invention.

6. Catalyst TL-10 (Dibutyl Tin Dilaurate):

(Manufacturer: Witco Chemical and others)

This is a very common organo-tin RTV (Room Temperature Vulcanization) silicone catalyst to provide the curing between the silicone polymer, crosslinkers and atmospheric moisture. Too high a level causes premature curing or gelling within the container. As a result, 0.75% of this material proved to be very effective.

Other organo-tin catalysts were not studied or evaluated because stannous octoate is too strong a catalyst and susceptible to hydrolysis. Others were not studied and are usually not the catalyst of choice for one-part silicone RTV formulations. They are weaker catalysts than the dibutyl tin dilaurate. However, they may work satisfactorily as well.

TABLE 3

Formulation of third embodiment

| Ingredient | Purpose | % by weight | Preferred % by weight | More Preferred % by weight | Example % by weight |
|---|---|---|---|---|---|
| 4,000 cps. viscosity Silanol Polymer (dihydroxy dimethyl polysiloxane) (hanse chemie OH 3.5 or Dow Corning ® 30-213 or equivalent) | Polymer Coating | 21.00 | 20–22 | 20–22 | 21.00 |
| Oxime Silane (Methyl tris-(2-butanone oxime) silane - hanse chemie OX 10 or equivalent) | Crosslinker | 4.00 | 3.0–5.0 | 3.8–4.2 | 4.00 |
| Oxime Silane (Vinyl tris-(2-butanone oxime) silane (hanse chemie OX 20 or equivalent)) | Crosslinker | 2.00 | 1.5–2.5 | 1.85–2.15 | 2.00 |
| Oxime Silane (tetra (2-butanone oxime) in toluene (hanse chemie OX 30 or equivalent)) | Crosslinker | 1.00 | 0.6–1.3 | 0.90–1.10 | 1.00 |
| TK-14 or Equivalent (dibutyl tin diacetate) | Catalyst | 0.015 | 0.01–0.02 | 0.01–0.02 | 0.015 |
| DME Dimethyl ether | Propellant | 25.20 | 25.20 | 25.20 | 25.20 |
| Pentane | Solvent | 46.785 | Balance | Balance | 46.785 |

Spray Actuator OTP 0025 is preferably used to dispense the formulation of the present invention from an aerosol can. Spray Actuator OTP 0025 is commercially available from Newman-Green, Inc., of Addison, Ill., http://www.newman-green.com/, as sprayhead model no. 120-24-18, having a slot size of 0.024 inch and an orifice diameter of 0.018 inch.

A standard aerosol valve could be used, but preferably a vapor tap valve is used.

Using a vapor tap valve eliminates the need to invert the can and flush it before repeated use. Preferably, the vapor tap valves is one commercially available from Newman-Green, Inc., of Addison, Ill., http://www.newman-green.com/, as Model No. C-10-123 (with 795-013 VT).

It is preferable that all aerosol cans be flushed with nitrogen prior to filling to eliminate any moist, humid air in the cans before filling with the ingredients. This is done to insure a dry atmosphere prior to filling.

The present invention is commercially available from Utilx as P/N 819081. A modified version of the text of the instructions for its use follows:

Silicone Protective Coating

Utilx P/N 819081

This product has been developed to provide a spray-on moisture barrier for telephone pedestals, splices, joints and other connecting devices that are subject to environmental conditions. The material sprays on as a liquid and catalyzes to a gel. The spray can be applied in one minute intervals. Each coat will provide a 1–4 mil film. The film can be built up to 1–125 mils. A period of for example 8–10 hours is needed for the material to completely dry.

The material has an extremely low dielectric (preferably below 3.45 @100 Hz), which makes it ideal for electrical applications. Once applied, the material can be wiped off with a clean rag. If left alone, it will form a permanent moisture barrier.

Directions:

1. Make sure the wiring or surface to be sprayed, is free of moisture and contaminants.

2. Hold the can around 10 inches away from the surface to be treated.

3. Spray thin even coats until the sprayed compound is seen to start to run.

4. Spray from different angles to completely cover the connection.

5. Allow to dry for more than one minute between coats.

6. If the button becomes clogged use a fresh button that is included with each can.

Attached to our U.S. Provisional Patent Application Ser. No. 60/489,818, filed 24 Jul. 2003, and incorporated herein by reference, is an MSDS for the commercially available embodiment of the present invention.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A silicone composition which can be sprayed from an aerosol can to form a gel, comprising:
about 10–30% by weight of a silanol polymer;

about 2.85–11.8% by weight of a cross linker;
about 0.01–1.0% by weight of a catalyst; and
about 55–80% by weight of a solvent, wherein:
the silanol polymer is at least one selected from the group consisting of α,ω-dihydroxy dimethlypolysiloxane silicone polymer, α,ω-dihydroxy dialkylpolysiloxane polymer, α,ω-di/trimethoxy dimethylpolysiloxane polymer, and α,ω-dihydroxy dimethyl diphenylpolysiloxane polymer;
and the cross linker comprises methyl tris-(2-butanone oxime)silane, vinyl tris-(2-butanoneoxime)silane, and tetra(2-butanone oxime)silane.

2. The composition of claim 1, wherein the composition has a viscosity of about 2,000–5,000 cps.

3. A spray-on moisture resistant coating produced by using the composition of claim 1.

4. The composition of claim 1, wherein the composition sprays on as a liquid and catalyzes to a gel.

5. The composition of claim 1, wherein the gel has a dielectric constant of about 2.0–4.0 @ 100 Hz.

6. The composition of claim 1, wherein the gel has a dielectric constant of not more than 3.7 @ 100 Hz.

7. The composition of claim 1, wherein the composition is air cured.

8. The composition of claim 1, wherein the silanol polymer is a silanol of a dialkyl polysiloxane polymer and/or a silanol of a diphenyl polysiloxane polymer.

9. Apparatus including:
an aerosol can; and
the composition of claim 1 in the aerosol can.

10. The apparatus of claim 9, wherein the aerosol can has a foaming dispensary.

11. The apparatus of claim 10, wherein the foaming dispensary is a spray actuator.

12. The apparatus of claim 9, further comprising a propellant.

13. The apparatus of claim 12, wherein the propellant is mixed with the composition such that the composition is 70–90% by weight and the propellant is 10–30% by weight.

14. A spray-on moisture resistant coating produced by using the apparatus of claim 9.

15. The apparatus of claim 9, wherein the aerosol can is flushed with nitrogen prior to filling.

16. A method of providing a moisture resistant coating, comprising using the apparatus of claim 9 to spray a coating onto an object to be protected.

17. A method of providing a moisture resistant coating, comprising spraying the composition of claim 1 onto an object to be protected.

18. The method of claim 17, wherein the object to be protected is wiring.

19. The method of claim 17, wherein the object to be protected is an electrical connection.

20. A spray-on moisture resistant coating produced by the method of claim 17.

21. The method of claim 17, wherein the moisture resistant coating is applied to an object selected from the group consisting of: telephone pedestals, the wiring of telephone pedestals, the connecting blocks of telephone pedestals, splices, joints, and other electrical connecting devices that are subject to environmental conditions.

22. The coating of claim 20, wherein the coating is about 1–125 mils thick.

23. The coating of claim 22, wherein the coating is about 10–40 mils thick.

24. The coating of claim 23, wherein when sprayed onto a surface, the composition provides a moisture resistant is coating is about 20–30 mils thick.

25. A silicone composition which can be sprayed from an aerosol can to form a gel, comprising:
about 10–30% by weight of a silanol polymer;
about 2.85–11.8% by weight of a cross linker;
about 0.01–1.0% by weight of a catalyst; and
about 55–80% by weight of a solvent, wherein:
the silanol polymer is at least one from the group consisting of α, ω-dihydroxy dimethyl polysiloxane silicone polymer, α, ω-dihydroxy dialkyl polysiloxane polymer, α, ωdi/trimethoxy dimethyl polysiloxane polymer, and α, ω-dihydroxy dimethyl diphenyl polysiloxane polymer;
the cross linker is at least one from the group consisting of methyl tris-(2-butanone oxime) silane, vinyl tris-(2-butanoneoxime) silane, tetra(2-butanone oxime) silane, and methyl trialkoxy silane;
the catalyst is at least one from the group consisting of dibutyl tin dilaurate, dibutyl tin diacetate, and dibutyl tin dioleate; and
the solvent is pentane.

26. A silicone composition which can be sprayed from an aerosol can to form a gel, comprising:
20–22% by weight 4,000 cps. viscosity dihydroxy dimethyl polysiloxane;
3.0–5.0% by weight methyl tris-(2-butanone oxime) silane;
1.5–2.5% by weight vinyl tris-(2-butanone oxime) silane;
0.6–1.3% by weight tetra-(2-butanone oxime) silane in toluene;
0.01–0.02% by weight dibutyl tin diacetate;
25.20% by weight dimethyl ether; and
pentane in an amount to make 100% by weight.

27. The composition of claim 26, comprising:
20–22% by weight 4,000 cps. viscosity dihydroxy dimethyl polysiloxane;
3.8–4.2% by weight methyl tris-(2-butanone oxime) silane;
1.85–2.15% by weight vinyl tris-(2-butanone oxime) silane;
0.90–1.10% by weight tetra-(2-butanone oxime) silane in toluene;
0.01–0.02% by weight dibutyl tin diacetate;
25.20% by weight dimethyl ether; and
pentane in an amount to make 100% by weight.

28. The composition of claim 26, comprising:
21.00% by weight 4,000 cps. viscosity dihydroxy dimethyl polysiloxane;
4.00% by weight methyl tris-(2-butanone oxime) silane;
2.00% by weight vinyl tris-(2-butanone oxime) silane;
1.00% by weight tetra-(2-butanone oxime) silane in toluene;
0.015% by weight dibutyl tin diacetate;
25.20% by weight dimethyl ether; and
46.785% by weight pentane.

* * * * *